June 10, 1924.    C. H. HARTMAN    1,496,986
FAUCET
Filed Oct. 2, 1923    2 Sheets-Sheet 1

Inventor
Chester H. Hartman
By ………… Attorney

June 10, 1924.　　　　　C. H. HARTMAN　　　　　1,496,986
FAUCET
Filed Oct. 2, 1923　　　　2 Sheets-Sheet 2
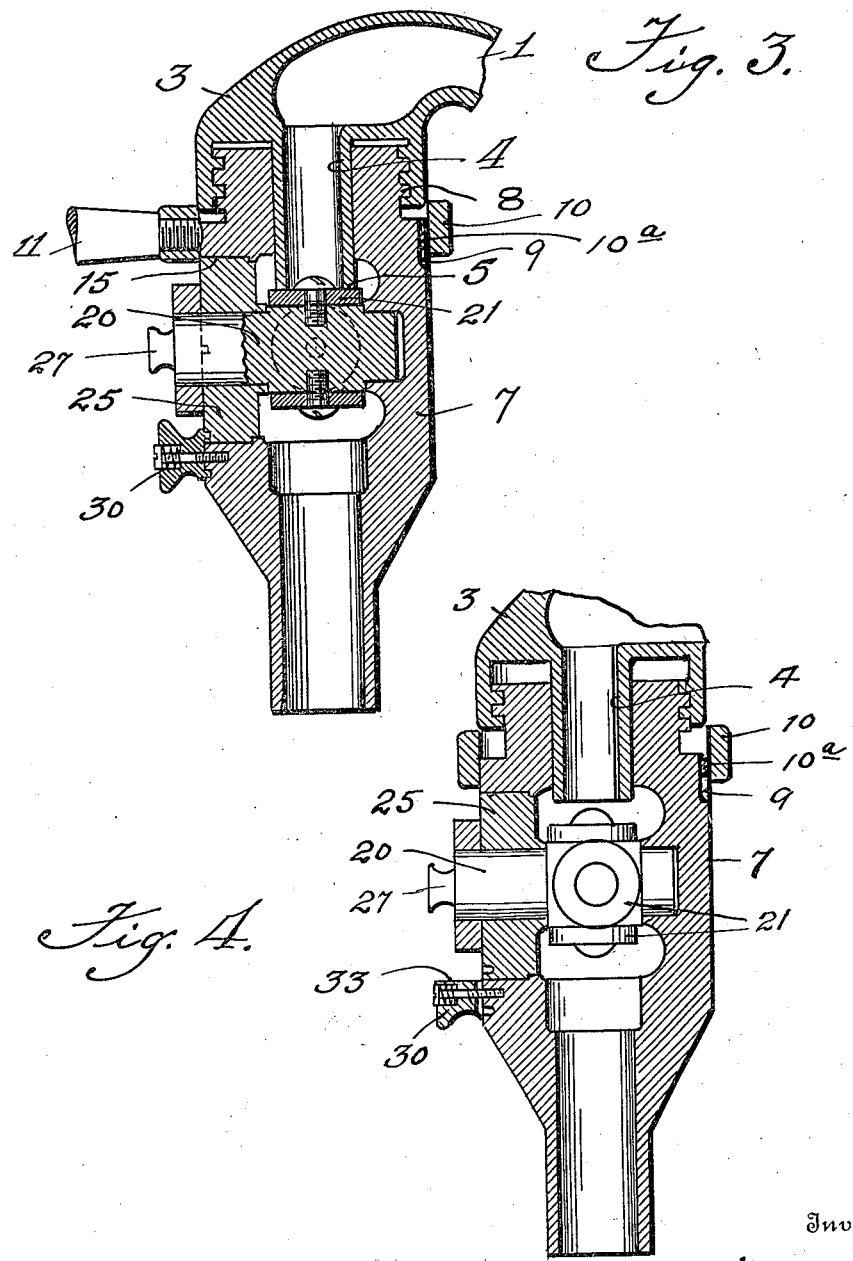

Patented June 10, 1924.

1,496,986

UNITED STATES PATENT OFFICE.

CHESTER H. HARTMAN, OF BOYERTOWN, PENNSYLVANIA.

FAUCET.

Application filed October 2, 1923. Serial No. 666,061.

*To all whom it may concern:*

Be it known that I, CHESTER H. HARTMAN, a citizen of the United States, residing at Boyertown, in the county of Berks and State of Pennsylvania, have invented certain new and useful Improvements in Faucets, of which the following is a specification.

This invention relates to improvements in faucets, and it has for its object the provision of means for prolonging the term of usefulness of the faucet without interruption, in so far as such interruption would be caused by the wearing out or disintegration of the valve closure member or washer.

To this end I have provided a faucet with a rotatable member provided with a plurality of valve closure members, each of which may, in turn, be brought into position for engagement with the opening through which the liquid enters the casing.

The invention comprises means for easily and rapidly adjusting any of these closure members for said engagement, and also means for easily and rapidly removing the said rotatable member when all of the closure members or washers have become faulty or leaky.

The device contemplates a faucet adaptable for use wherever liquids are to be tapped, one in which there will be no appreciable loss of time and annoyance when it is found necessary to remedy a leak due to worn washer, and one in which the entire set of washers or valve closures may be replaced by any one capable of manipulating a screw driver, the primal object being to provide a faucet for family or household use and which will not require the services of a mechanic when its valve closures require attention.

The invention is more fully described in the following specification and clearly illustrated in the accompanying drawings, in which:—

Figure 3 is a vertical, central sectional view showing the faucet in closed position.

Figure 4 is a like view, showing the open position, in which position the valve closure barrel may be withdrawn.

Figure 1:
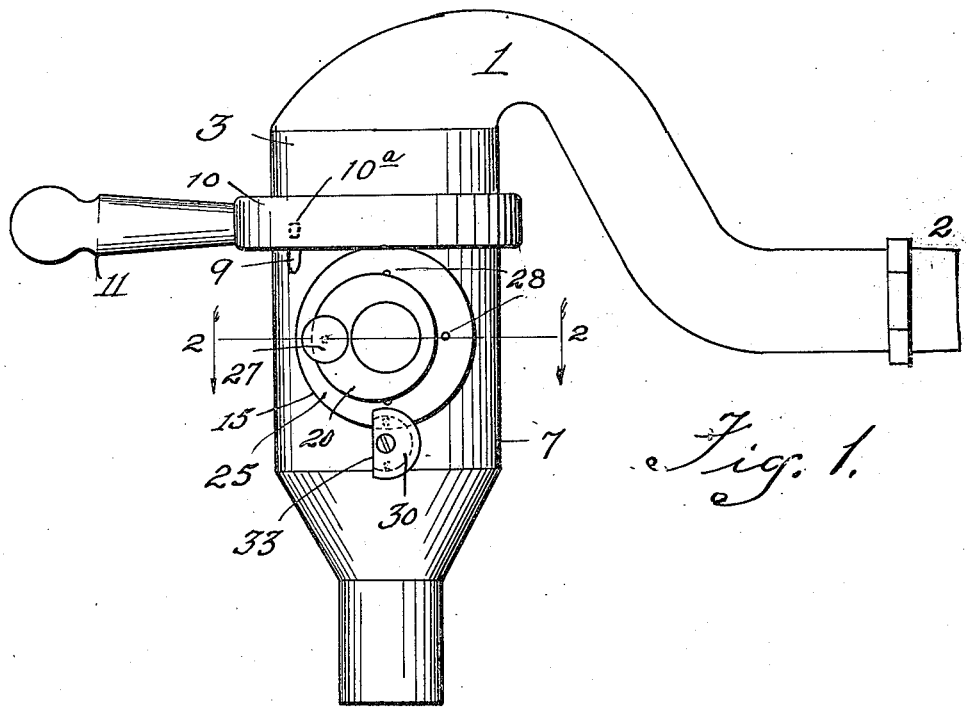
Figure 1 is a side elevational view of the faucet.
Figure 2:
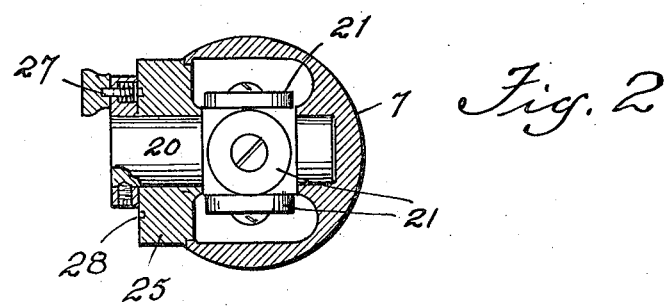
Figure 2 is a sectional view taken on line 2—2 of Figure 1.

The numeral 1 designates the inlet portion of the faucet casing, and is provided with means for attaching it to the source of supply, 2. This casing member has its one extremity enlarged, as at 3, and this end is screw-threaded internally, and it is provided with the liquid inlet tube 4 which is provided with a valve seat 5 on its end.

The numeral 7 designates the rotatable member of the casing, formed with a threaded upper end 8 to enter the threaded portion of the member 1. The upper end of the body of this member 7, just beneath the screw-threaded portion, is formed with a plurality of vertical grooves 9, and 10 designates the actuating handle of the faucet. This handle comprises a ring member, formed with one or more internal lugs $10^a$, and it fits loosely over the enlarged end 3 of the member 1, but capable of being lowered into engagement with the upper end of the member 7 where its lugs will register with the grooves 9. This ring is provided with a handle or grip member 11, provided with a screw at one end which passes through a screw-threaded opening in the ring, and when in position on the lower member 7, the tightening of this handle member will provide the means for rotating the member 7 to open and close the faucet.

The member 7 is formed with a circular opening 15 and into this opening is fitted for rotation, a barrel 20, and this barrel is provided with a plurality of valve closure members or washers 21, each of which is adapted to be brought into line for engagement with the valve seat 5, when the handle is turned. The barrel is carried by a ring 25 which fits in the member opening 7 and the barrel is provided with a spring backed pin 27, while the ring is formed with a plurality of depressions 28, corresponding in number and in alinement with, the closure members or washers, so that, when it is desired to present a new closure to the valve seat, this pin 27 is drawn out and held while the barrel is rotated until the next or another depression 28 is reached, when it will be pressed thereinto and held against further independent rotation in the ring.

When the entire set of washers has become useless, and it is desired to replace them, the barrel and its co-acting ring may be removed from the casing by first releasing the ring 10 by unscrewing the handle grip, sliding it up on the casing and then withdrawing the spring backed securing pin 30 and turning it until the flat surface of the head portion of the pin, 33, is in line with the edge of the ring 25, which ring is provided also with a depression for receiving the end of the pin 30.

This securing pin for the ring 25 is located at the front of the casing, centrally disposed, and is provided with a two-point projection, one of which enters the depression in the ring 25, as just above described, and the other a like depression in the body of the casing member, so that when both points are engaged, the pin member will not be likely to be rotated when the faucet is opened or closed, or more particularly when the barrel 20 is rotated.

Having thus fully described my invention, what I claim and desire to secure by Letters Patent is:—

1. A faucet comprising a two-part casing, one of which is rotatable in the other, a handle removably attached to the rotatable member, and having means for engaging said member for actuation, a valve seat within the casing, a removable barrel located in the casing, a plurality of valve closure members carried by said barrel, a ring carried by the barrel and fitting in the casing, means for rotating the barrel in the ring to present each valve closure to the valve seat, and a spring backed pin on the casing adapted to hold said ring against rotation.

2. In a faucet, the combination of a casing, a valve seat therein, a barrel carrying a plurality of valve closure members, a ring carried by the barrel and fitting in the casing, a spring backed pin to hold the barrel in adjusted position in the ring and against independent rotation therein, and a spring backed pin on the casing adapted to hold the ring in adjusted position and against independent rotation in the casing.

3. In a faucet, a casing, a valve seat therein, a rotatable barrel in the casing provided with a plurality of closure members for said valve, a ring carried by the barrel and in which it may rotate, means for securing it against rotation in the ring and means on the casing for securing the ring and barrel against rotation in the casing.

4. In a faucet, a casing having a valve seat therein, a rotatable barrel carrying a plurality of closure members for the valve seat, a ring carried by the barrel and fitting in the casing, means for presenting any of said closure members to the valve seat, and spring-backed means for holding said barrel and ring in position in the casing.

In testimony whereof I affix my signature.

CHESTER H. HARTMAN.